US007171401B2

(12) United States Patent
Tanaka

(10) Patent No.: US 7,171,401 B2
(45) Date of Patent: Jan. 30, 2007

(54) DATA PROCESSING SYSTEM AND METHOD HAVING HIGH AVAILABILITY

(75) Inventor: Toshikazu Tanaka, Chiba-ken (JP)

(73) Assignee: International Business Machines Corporation, Armonk, NY (US)

(*) Notice: Subject to any disclaimer, the term of this patent is extended or adjusted under 35 U.S.C. 154(b) by 682 days.

(21) Appl. No.: 10/101,422

(22) Filed: Mar. 19, 2002

(65) Prior Publication Data

US 2002/0143756 A1 Oct. 3, 2002

(30) Foreign Application Priority Data

Mar. 30, 2001 (JP) ............................ 2001-102342

(51) Int. Cl.
| | |
|---|---|
| G06F 7/00 | (2006.01) |
| G06F 17/30 | (2006.01) |
| G06F 12/00 | (2006.01) |
| G07B 17/00 | (2006.01) |
| G07F 19/00 | (2006.01) |

(52) U.S. Cl. ............................ 707/3; 707/10; 707/204; 705/30

(58) Field of Classification Search .................. 707/3, 707/4, 10, 101, 204; 705/26, 34–35, 37, 705/38, 40, 42, 30, 36; 714/7; 711/162; 370/398
See application file for complete search history.

(56) References Cited

U.S. PATENT DOCUMENTS 5,440,727 A * 8/1995 Bhide et al. ................. 711/117
5,850,395 A * 12/1998 Hauser et al. ............... 370/398
5,873,099 A * 2/1999 Hogan et al. ................ 707/204
5,940,813 A * 8/1999 Hutchings ..................... 705/43
5,987,452 A * 11/1999 Kung ............................. 707/4
6,023,772 A * 2/2000 Fleming ....................... 714/13

(Continued)

FOREIGN PATENT DOCUMENTS

JP PUPA 11-134417 5/1999

(Continued)

OTHER PUBLICATIONS

S. Jablonski, T. Ruf, and H. Wedekind (1990), Concepts and methods for the optimization of distributed data processing, pp. 171-180.*

(Continued)

Primary Examiner—Don Wong
Assistant Examiner—Merilyn Nguyen
(74) Attorney, Agent, or Firm—Duke W. Yee; John R. Pivnichny; Wayne P. Bailey

(57) ABSTRACT

A system such as an accounting system providing highly reliable continuous operation services at low cost. The system is configured to transfer data asynchronously between a main system that operates in daytime mode and a subsystem that operates in nighttime mode. A sub-database receives and stores only data required in transactions performed in nighttime mode from the main system and its main database. The subsystem, which is responsible for performing processes in nighttime mode, transfers a log of transactions performed in nighttime mode to the main system through a subsystem queuing box on returning to the daytime mode and data re-processed by a main processor in the main system is stored in the main database based on the transaction log.

14 Claims, 12 Drawing Sheets

U.S. PATENT DOCUMENTS

| | | | |
|---|---|---|---|
| 6,026,379 A * | 2/2000 | Haller et al. | 705/34 |
| 6,058,375 A * | 5/2000 | Park | 705/30 |
| 6,202,054 B1 * | 3/2001 | Lawlor et al. | 705/42 |
| 6,263,302 B1 * | 7/2001 | Hellestrand et al. | 703/17 |
| 6,502,205 B1 * | 12/2002 | Yanai et al. | 714/7 |
| 6,678,704 B1 * | 1/2004 | Bridge et al. | 707/202 |
| 6,804,676 B1 * | 10/2004 | Bains, II | 707/101 |
| 7,100,020 B1 * | 8/2006 | Brightman et al. | 712/18 |
| 2001/0002468 A1 * | 5/2001 | Nel | 705/26 |
| 2002/0161698 A1 * | 10/2002 | Wical | 705/38 |

FOREIGN PATENT DOCUMENTS

JP　　PUPA 2000-047986　　2/2000

OTHER PUBLICATIONS

Peter Chikeung Lee and Sumit Ghosh (1994), NOVAHID: A Novel Architecture for Asynchronous, Hierarchical, Intermaltional, distributed, Real-Time Payments Processing, pp. 1072-1087.*

* cited by examiner

FIG. 2

| | TRANSACTION INPUT MEDIUM | |
|---|---|---|
| | ATM | OTHER INSTITUTION |
| INQUIRY SERVICES | | |
| INQUIRY FOR ORDINARY/SAVING DEPOSIT ACCOUNT BALANCE | O | O |
| INQUIRY FOR FINANCE LOAN ACCOUNT BALANCE | O | O |
| INQUIRY FOR ORDINARY/SAVING DEPOSIT TRANSACTIONS | X | X |
| INQUIRY FOR TRANSFER ACCEPTANCE | X | X |
| CHECKING TRANSFEROR/RECIPIENT | O | O |
| UPDATE SERVICES | | |
| ADDITION OF MONEY TO ORDINARY/SAVING DEPOSIT/FINANCE LOAN ACCOUNT | O | O |
| WITHDRAWAL FROM ORDINARY/SAVING DEPOSIT/FINANCE LOAN ACCOUNT | O | O |
| TRANSFER FROM ORDINARY/SAVING DEPOSIT/FINANCE LOAN ACCOUNT | X | X |
| ABOVE-MENTIONED SERVICES USING BANKBOOK | X | X |
| SERVICES UNAVAILABLE IN NIGHTTIME MODE | | |
| BANKBOOK UPDATE | X | X |
| TAX/CHECKING ACCOUNT/TIME/INSTALLMENT/NOTICE DEPOSIT/TRANSFER PAYMENTS | X | X |
| EXCHANGE TRANSFER | X | X |
| SERVICES FOR OTHER BANK'S DEBIT CARD | | |
| DEPOSIT WITH OTHER BANK'S DEBIT CARD | O | X |
| WITHDRAWAL/BALANCE INQUIRY WITH OTHER BANK'S DEBIT CARD | O | X |
| MONEY-LENDING SERVICE | O | X |

DATA PROCESSING SYSTEM AND METHOD HAVING HIGH AVAILABILITY

FIELD OF THE INVENTION

The present invention relates to a data processing system and accounting system used in organizations such as financial institutions.

BACKGROUND

As is well known, data processing systems having databases, including accounting systems in financial institutions such as banks, are used in various organizations.

FIG. 12 shows an example of such a data processing system, which is an accounting system for managing transactions for customer accounts in a financial institution. As shown in FIG. 12, a prior-art accounting system comprises a main database 10 for storing data such as a transaction history of customer accounts and a system unit 20 for performing a process according to a transaction for a customer account.

The system unit 20 performs various processes according to requests (data process requests) sent from an on-premises terminal 30 as well as an external-institution interface 31 and an ATM (Automatic Teller Machine) 32 connected through a communication controller 40. The on-premises terminal 30 accepts a transaction requested by a customer at a teller's window and an in-house data management operation. The external-institution interface 31, which is connected to systems at other tied-in financial institutions, accepts a transaction from a customer of another financial institution to its own customer and a transaction performed by its own customer through an ATM of another institution.

The system unit 20 comprises a main processor 21 for performing various transaction processes according to requests provided from the on-premises terminal 30 as well as requests provided from the external-institution interface 31 and the ATM 32 through the communication controller 40 and a process information transmitter/receiver 24, a center cut processor 22 for performing processes such as automatic transfer services, a database manager 23 for controlling data input-output to and from the main database 10, and the process information transmitter/receiver 24 for sending and receiving process information to and from the external communication controller 40.

Data such as transaction history data including transaction dates, transaction items, and balances on accounts are stored in the main database 10 based on processes performed in the main processor 21 and center cut processor 22.

The data thus stored in the main database 10 is especially critical to financial institutions. Therefore, the backbone system requires high reliability. Thus, various strategies such as dual-redundancy of the main database 10 have been adopted.

Some financial institutions having a backbone system and described above have recently extended the operating time of their ATMs 32 for improving their customer services. For example, some financial institutions operate their ATMs 24 hours a day. Typically, if an ATM 32 operates on a 24-hour basis, the backbone system itself of course would operate on a 24-hour basis. This may give rise to the following problems.

In the past, in order to maintain the recall ratio of the main database 10, maintenance could be performed in the nighttime, during which customer services are shut down. However, if the system operates on a 24-hour basis, time for performing the maintenance tasks cannot be made. Although the main database 10 or the entire backbone system may be duplicated for the maintenance, providing the redundant systems would require huge costs.

Furthermore, in the past, when data at the end of a month was required by the financial institution, the data was retrieved from the main database 10 after the end of operating time for customers at the month-end. For 24-hour operation, on the other hand, data in the main database 10 is updated each time an ATM 32 is used by a user, therefore such data cannot be retrieved in a straightforward manner.

In view of these problems, it is apparent that a full reorganization or reconstruction of the backbone system, such as the provision of redundant backbone systems, would be required in order to achieve the 24-hour operation of the ATM 32. In addition, some financial institutions use a conventional backbone system in which the batch processing of data is performed primarily. In such a case, the backbone system should be entirely replaced with new one. Of course, the full reorganization or reconstruction of the backbone system or complete replacement requires a large investment. Therefore, some financial institutions cannot shift to 24-hour operation of ATMs 32.

In addition, if trouble occurs during the shift from the old backbone system to a new backbone system, the entire backbone system can be shut down in the worst case. Therefore, careful preparations and precautions are required for replacing the entire backbone system.

The above-mentioned problems are not limited to backbone systems in financial institutions. They are common to data processing systems used in other applications.

SUMMARY

The present invention summary solves these technical problems. It is a primary object of the present invention to provide a data processing system and accounting system that have high reliability and realize continuous operating services.

To attain these objects, in a data processing system according to the present invention, a data storage receives and stores at least part of the data stored in a database of an alternative data processing system, a process execution module performs a predetermined process on data based on a process request input from an external source and the data stored in the data storage, and a data transfer module transfers information about a change in the data stored in the data storage that occurs as a result of the performed process to the alternative data processing system, in an asynchronous manner.

The data processing system and the alternative data processing system may be backbone systems of financial institutions, for example. The data processing system may process services provided to customers through ATMs in the nighttime and the alternative system may process services provided to the customers in the daytime. Only the data required for processing in the nighttime is received from the database of the alternative data processing system and stored in the data storage, and, after the end of the nighttime service period, a change in the data that occurs as a result of a process such as a transaction performed in the nighttime is transferred to the alternative data processing system. The data transfer to the alternative data processing system may be performed in response to a request provided from the alternative data processing system.

Data processing in such a data processing system may be a transaction such as deposit/withdrawal on a customer account in the backbone system of a financial institution, for example. A balance on the account changed as a result of the transaction is transferred as change information.

Thus, the data processing system can asynchronously transfer the data to the alternative data processing system, thereby allowing the operation of the alternative data processing system to be shut down while the data processing system is performing processes.

Data processing requests input from an external source may be assigned between the data processing system and the alternative data processing system by a distribution controller according to a predetermined condition such as a predetermined time period, for example. In this case, the operation of the data processing system can be shut down while a data processing request is distributed to the alternative data processing system.

The change information may be temporarily stored in a change information storage and, when the destination of processing requests is changed from the data processing system to the alternative data processing system, the stored change information may be transferred to the alternative data processing system.

In the data processing system of the present invention, a selective transfer module selects one of a first data processing unit and a second data processing unit provided separately from the first data processing unit and transfers data processing request provided from the external source and accepted in a request acceptance module to the selected destination. Then the first or second data processing unit to which the processing request is transferred processes data. If the first data processing unit processes the data, the processed data is temporarily stored in the data transfer module and, when requested by the second data processing unit, the processed data is asynchronously transferred to the second data processing unit. On the other hand, if the second data processing unit processes the data, the processed data is temporality stored in the data transfer module and, when requested by the first data processing unit, the processed data is transferred to the first data processing unit.

The selective transfer module can change the destination of a processing request from the first to second data processing unit, from the second to first data processing unit according to the time when the request acceptance module has accepted the processing request. This enables the switching between the first data processing unit to the second data processing unit to take place depending on certain time periods.

Furthermore, in the data processing system, the first data processing unit may reference data such as customer account information stored in a first data storage, perform a process based on the referenced data and a processing request, and store the processed data in the first data storage. The second data processing unit may reference data stored in a second data storage in which part of data stored in the first data processing unit is stored, perform a process based on the referenced data and a processing request, and store the processed data in the second data storage.

In addition, the first data processing unit may transfer data that meets predetermined criteria, for example data required in processing by the second data processing unit, out of the processed data to the second data processing unit through the data transfer module. The second data processing unit may then store the transferred data in the second data storage.

When the selective transfer module changes the destination of a processing request from the second data processing unit to the first data processing unit, the data transfer module transfers at least part of the data stored by the second data processing unit in the second data storage to the first data processing unit. That is, the data to be processed by the second data processing unit is transferred to the first data processing unit. Then the first data processing unit performs a predetermined process based on the data transferred from the second data processing unit and stores the processed data in the first data storage.

A method of operating a data processing system according to the present invention comprises the steps of: processing a processing request provided from an external source in a first processing system and storing data resulting from the process in a first database; asynchronously transferring at least part of the resulting data to a second database through a data transfer module and storing the data in the second database; changing the recipient of the processing request provided from the external source from the first data processing system to a second data processing system; and processing the processing request provided from the external source in the second data processing system and storing data resulting from the process in the second database, wherein the method may further comprise the steps of: providing the data resulting from the process in the second processing system to the data transfer module; asynchronously retrieving by the first processing system the data resulting from the process in the second processing system from the data transfer module and storing the data by the first processing system in the first database; and changing the recipient of the processing request provided from the external source from the second processing system to the first processing system. The changing step may be performed through message communications through the data transfer module.

In addition, when the first processing system stores in the first data base the data resulting from the process in the second processing system, the first processing system may re-execute the process performed in response to the processing request provided from the external source and received by the second processing system, and data resulting from the process executed by the first processing system may be stored in the first database.

The present invention can be viewed as a data processing system connected to an existing financial transaction system including a database. The data processing system receives part of the account information stored in the database from a financial transaction system such as a bank accounting system and stores it in a data storage. A transaction execution module references the accounting information stored in the database based on a transaction request transmitted from a terminal operated by a customer and executes a transaction in response to the transaction request. A data transfer module then asynchronously transfers account information changed by the execution of the transaction to the financial transaction system. A switching controller switches the connection of the terminal between the financial transaction system and this system, thereby allowing the transaction request provided from the terminal to be distributed to the financial system or the system depending on a time period.

The data transfer module may store transaction data on a transaction performed in the transaction execution module, such as a transaction log that includes at least a transaction request in a transaction data storage, and may transfer the transaction data to the financial transaction system when the switching controller changes the connection of the terminal from the system to the existing financial transaction system. When the financial system receives the transaction data, it may store it in its database, or it may re-execute a process that has been executed by the transaction execution module, based on the transaction request included in the transaction data.

The transaction execution module and the data transfer module may be duplicated in a configuration like mirroring or clustering, thereby allowing the maintenance of the system to be performed while it is operating.

In an accounting system according to the present invention, account information concerning customer accounts is stored in the first database, and part of the account information stored in the first database is stored in a second database. An asynchronous data transfer module asynchronously transfers data between the first and second databases. A mode switching controller switches between a first mode in which a first data processing unit and the first database operate and a second mode in which a second data processing unit and the second database operate according to, for example, predetermined time periods.

During this switching, the first data processing unit references the account information stored in the first database to execute a transaction in response to a transaction request sent from a terminal on which a customer performs a transaction operation through a communication controller which controls data communication initiated by the terminal to the accounting system, and stores changed account information in the first database. The second data processing unit references the account information stored in the second database to execute a transaction in response to a transaction request and stores changed account information in the second database.

The first data processing unit extracts information to be used in the second mode from the changed account information through a transaction and sends it to the second data processing unit. The second data processing unit stores the extracted information in the second database, thus resulting in the part of the account information being stored in the first database to be stored in the second database.

Furthermore, during the switching from the second mode to first mode, the second data processing unit may send at least a customer account number and transaction item in the transaction request as a transaction log to the first data processing unit, the first data processing unit may re-execute a transaction process for the transaction request based on the transaction log and store account information changed as a result of the process in the first database. Thus, strictly data processed by the first data processing unit is stored in the first data storage.

Moreover, in this accounting system, the first data processing unit may perform a transaction menu in the first mode and the second data processing unit may perform only a part of the transaction menu in the second mode. For example, bankbooks may be handled only in the first mode and not in the second mode.

The present invention may be a data processing system comprising a data storage for receiving and storing part of the account information stored in a database from a financial transaction system such as a bank accounting system, a transaction execution module for referencing the account information to execute a transaction in response to a transaction request, and a difference information storage for storing difference information caused in the account information as a result of the executed transaction.

The difference information storage can output the difference information to the accounting system in response to a request therefrom.

BRIEF DESCRIPTION OF THE DRAWINGS

FIG. 2 shows examples of services provided in nighttime mode and daytime mode;

DETAILED DESCRIPTION

The present invention will be described below with respect to embodiments shown in the accompanying drawings. In the following description, components similar to those in the prior-art configuration shown in FIG. 12 will be labeled with like reference numbers, the description of which will be omitted.

Figure 1:
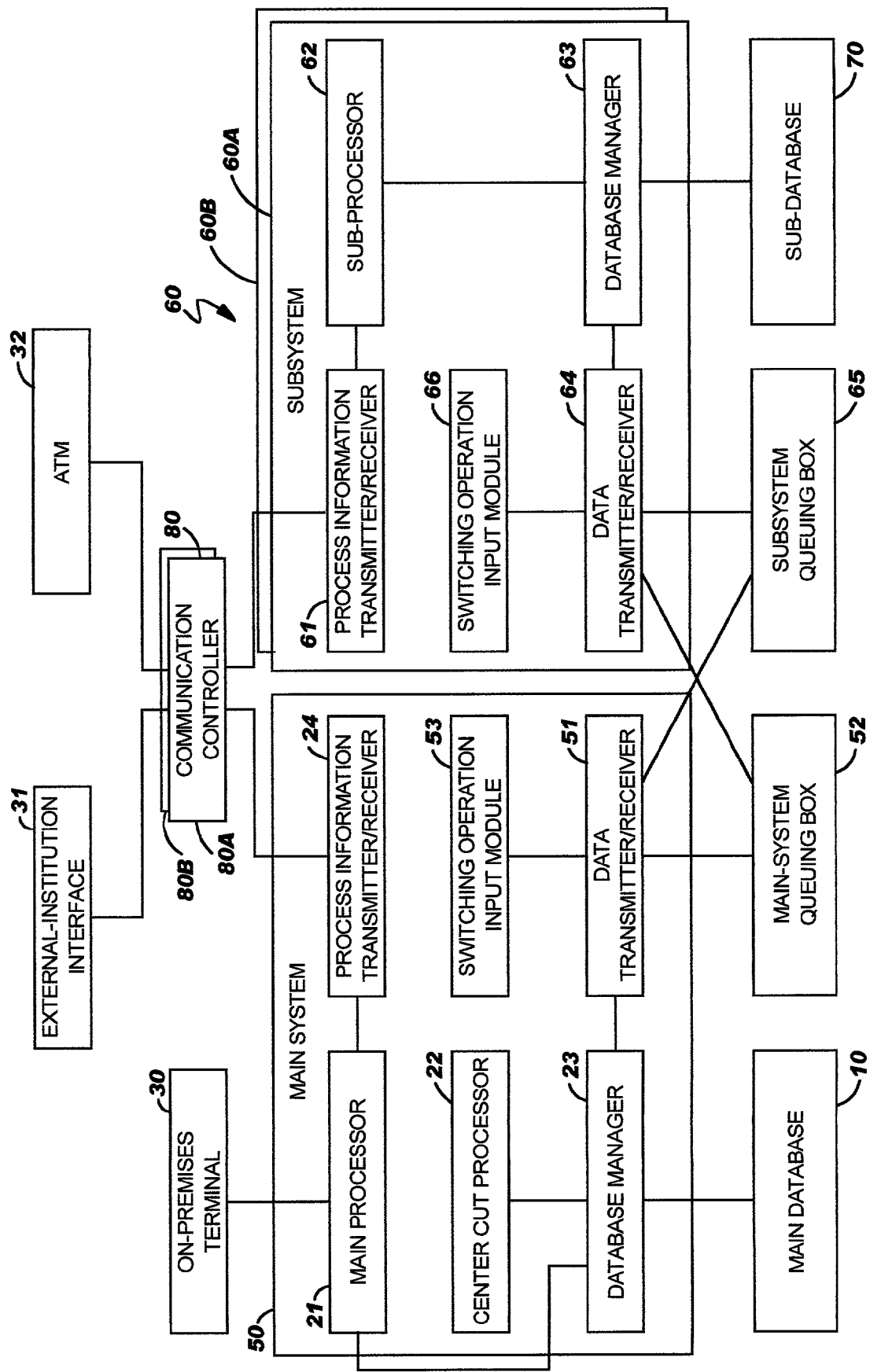
FIG. 1 shows a general configuration of a backbone system according to an embodiment of the present invention.

FIG. 1 is a diagram for illustrating a configuration of a backbone system (data processing system or accounting system) in a financial institution according to an embodiment of the present invention. As shown in FIG. 1, the backbone system comprises a main system (alternative data processing system or a first data processing unit) 50 for performing a process in daytime mode (first mode) provided in a time period including business hours of the financial institute and a subsystem (data processing system, second data processing unit, system, or financial processing apparatus) 60 for performing a process in nighttime mode (second mode) provided in a time period other than the daytime.

A main database (database, first storage, or first database) 10 is provided for storing data on which a process is performed in the main system in daytime mode, and a sub-database (data storage, second data storage, or second database) 70 is provided for storing data on which a process is performed by the subsystem 60 in nighttime mode.

In such a backbone system, a on-premises terminal 30 is connected to the main system 50 and an external-institution interface 31 and an ATM (terminal) 32 can be connected to both the main system 50 and the subsystem 60 through a communication controller (distribution controller, processing request acceptance module, selective transfer module, or switching controller) 80. The communication controller 80 controls data communication between the external-institution interface 31 or the ATM 32 and the main system 50 or the subsystem 60, transmits a processing request transferred from the external-institution interface 31 and the ATM 32 to the main system 50 or the subsystem 60, and returns a response to the request provided from the main system 50 or the subsystem 60 to the external-institution interface 31 and the ATM 32. The communication controller 80 switches the connection destination of the external-institution interface 31 and the ATM 32 between the main system 50 and the subsystem 60 depending on a predetermined condition, a predetermined time period in this embodiment, to assign a process request transferred from the external-institution interface 31 and the ATM 32 to the main system 50 or the subsystem 60.

An existing backbone system (the system unit shown in FIG. 12) may be used as the main system 50. The main system 50, components of which perform predetermined processes according to a predetermined program, comprises a main processor 21 for performing various processes according to requests provided from the on-premises terminal 30, the external-institution interface 31, and the ATM 32; a center cut processor 22 for performing processes such as automatic transfer services; a database manager 23 for controlling data input/output to and from the main database 10; and the process information transmitter/receiver 24 for sending and receiving process information to and from the external-institution interface 31 and the ATM 32 through the communication controller 80.

On the other hand, the subsystem 60, components of which perform predetermined processes according to a predetermined program, comprises a process information transmitter/receiver 61 for sending and receiving process information to and from the external-institution interface 31 and ATM 32 through the communication controller 80. The subsystem 60 herein accepts a customer transaction only from the external-institution interface 31 and the ATM 32 in nighttime mode and therefore is configured so as to accept no transactions from the on-premises terminal 30. The subsystem 60 comprises a sub-processor (process executer or transaction executer) 62 for performing a process such as a withdrawal from an account, according to a request which is sent from the external-institution interface 31 or the ATM 32 and accepted in the process information transmitter/receiver 61. A database manager 63 controls data input/output to and from the sub-database 70 according to the process performed in the sub-processor 62.

To exchange data between the main system 50 and the subsystem 60, data transmission is performed in an asynchronous manner over an asynchronous data network (data transfer module, asynchronous data transfer module). For this purpose, provided in the backbone system are a data transmitter/receiver 51 for controlling data transmission/receipt performed in the main system 50, a main-system queuing box 52 for queuing data to be sent from the main system 50, a data transmitter/receiver 64 for controlling data transmission/receipt performed in the subsystem 60, and a subsystem queuing box (change storage, transaction data storage, or difference information storage) 65 for queuing data to be sent from the subsystem 60.

The data transmitter/receiver 51 of the main system 50 puts (Put) data in the main-system queuing box 52 and retrieves (Get) data from the subsystem queuing box 65. The data transmitter/receiver 64 of the subsystem 60 puts (Put) data in the subsystem queuing box 65 and retrieves (Get) data from the main-system queuing box 52. The data retrieval from the subsystem queuing box 65 by the data transmitter/receiver 51 and the data retrieval from the main-system queuing box 52 by the data transmitter/receiver 64 are automatically performed at predetermined time intervals during the operating time of the main system 50 and during the operating time of the subsystem 60, respectively. The data queuing in both the main system queuing box 52 and subsystem queuing box 65 may be first-in-first-out.

The main system 50 and the subsystem 60 comprise switching operation input modules 53, 66 for switching between daytime mode and nighttime mode. The switching operation input modules 53, 66 accept an automatic operation by a timer or a manual operation by an operator to switch between daytime mode and nighttime mode.

The subsystem 60 and the communication controller 80 having the above-described configuration may be duplicated in a manner similar to the techniques called mirroring and clustering in order to perform maintenance of the subsystem 60 itself and communication controller 80 itself.

In the backbone system configured as described above, the main system 50 is responsible for processing in daytime mode and the subsystem 60 is responsible for processing in nighttime mode. FIG. 2 shows an example of services provided on an ATM 32 and services provided on an ATM of another financial institution through the external-institution interface 31 in daytime mode and nighttime mode. In FIG. 2, symbol "○" indicates services provided in both nighttime mode and daytime mode, and symbol "x" indicates services provided only in daytime mode. For example, the addition of money to a customer's ordinary deposit account (indicated by symbol W in FIG. 2) can be handled at the ATM 32 and an ATM of another institution through the external-institution interface 31 in both nighttime mode and daytime mode. Transactions such as the entry of a transaction history into a bankbook (indicated by symbol Y in FIG. 2) and the addition of money to an ordinary deposit account by using a bankbook (indicated by symbol Z in FIG. 2) for example can be performed in daytime mode but not in nighttime mode. In this way, only some of services (transaction menu) provided in daytime mode are provided in nighttime mode in this embodiment. The transactions shown in FIG. 2 are just a few examples and of course may be changed according to services provided by individual financial institutions.

Information such as account number, personal identification number (password) that identifies a pre-registered customer account as well as account data such as account balance and a transaction history is stored in the main database 10.

On the other hand, the sub-database 70 contains part of the data stored in the main database 10, in particular, the minimum data required for performing processes in the subsystem 60 in nighttime mode. For example, if transaction services indicated by symbol "○" in FIG. 2 are provided in nighttime mode, information such as an account number and personal identification number (password) that identifies a pre-registered customer account as well as data such as the account balance are stored, but data concerning services that are not provided in nighttime mode is not held in the sub-database 70. For example, because bankbook updating services are not provided in nighttime mode, transaction histories are not held and only the current account balance data is held. This eliminates the need for holding unnecessary data in the sub-database 70, thereby requiring less data storage capacity.

The daytime-mode and nighttime mode operations of a backbone system configured as described above will be described below.

Figure 3:
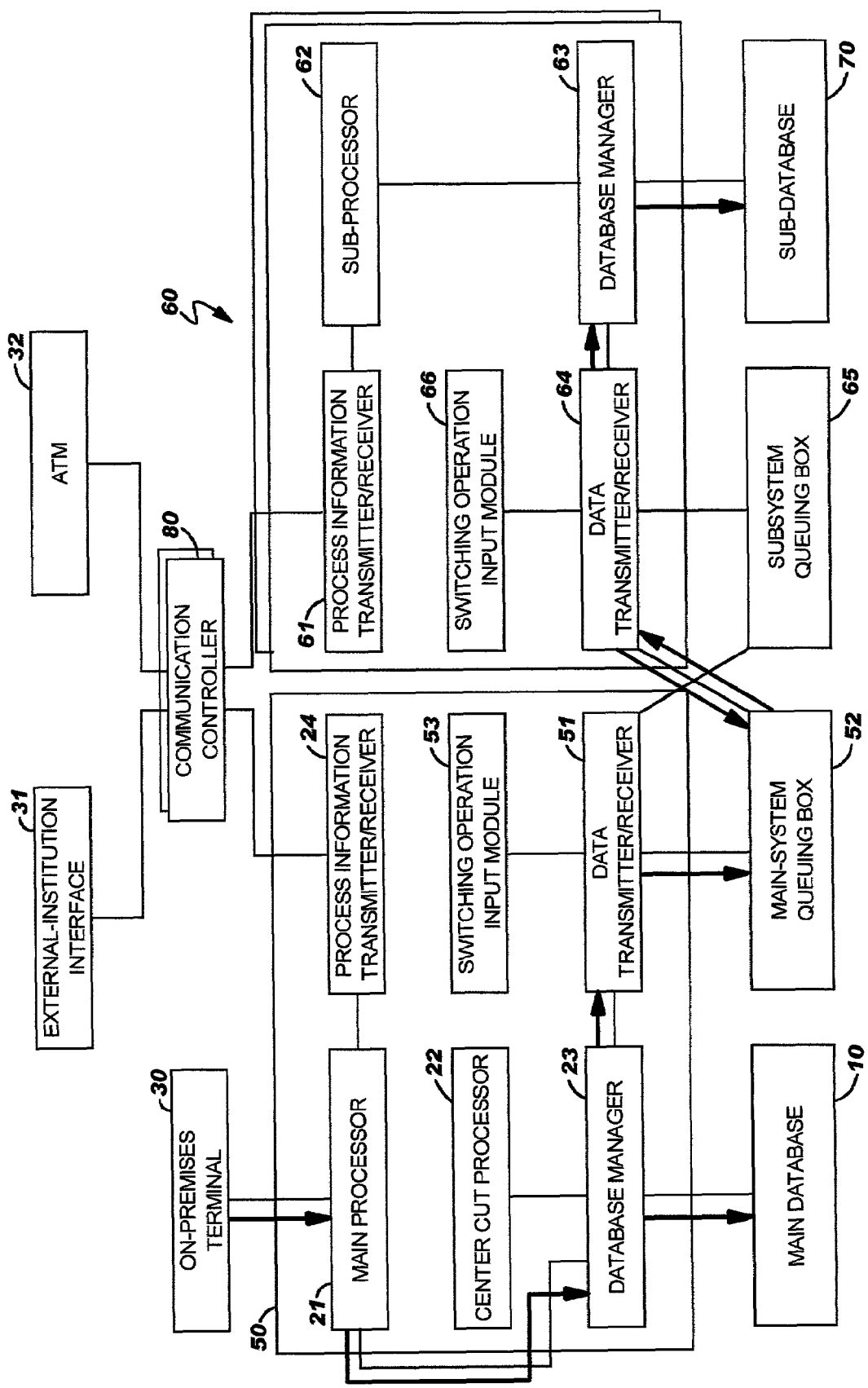
FIG. 3 shows a flow of a process performed in response to a process request provided from an on-premise terminal in daytime mode.

FIG. 3 shows an operation of a backbone system for performing a process in response to a request from the on-premises terminal 30 in daytime mode. When the on-premises terminal 30 accepts a transaction such as deposit, withdrawal, or transfer that is requested by a customer, the on-premises terminal 30 transfers account identification information such as an account number and personal identification number that identify the account of the customer, and transaction request information on transaction items (for example, the specifications of deposit or withdrawal and the amount) requested by the customer to the main processor 21 in the main system 50.

The main processor 21 references data stored in the main database 10 through the database manager 23 based on the transferred account identification information and transaction request information, verifies and authenticates the account based on the account identification information, and then performs the requested transaction. Account information (processed data and data resulting from the process), such as the account balance that has been changed as a result of the transaction, is stored in the main database 10 through the database manager 23. The transaction request information, the results of the transaction executed based on the request, the amount actually deposited or withdrawn, and a transaction log indicating the transaction items may also be stored in the main database 10.

The database manager 23 extracts, from the account information and transaction request information received from the main processor 21 and changed as a result of the transaction, only the information such as the account balance that is required by the subsystem 60 in nighttime mode to generate transfer data (part of the account information) and transfers it to the data transmitter/receiver 51. The data transmitter/receiver 51 receives the transfer data and places it in a main-system queuing box 52.

In the subsystem 60, the data transmitter/receiver 64, which retrieves data from the main-system queuing box 52 with predetermined timing, for example at predetermined time intervals, retrieves the transfer data from the main-system queuing box 52 and provides it to a database manager 63. The database manager 63 stores the provided transfer data in a sub-database 70.

Thus, the change in the account information (such as the account balance) resulting from the transaction performed in daytime mode is reflected in the sub-database 70.

Figure 4:
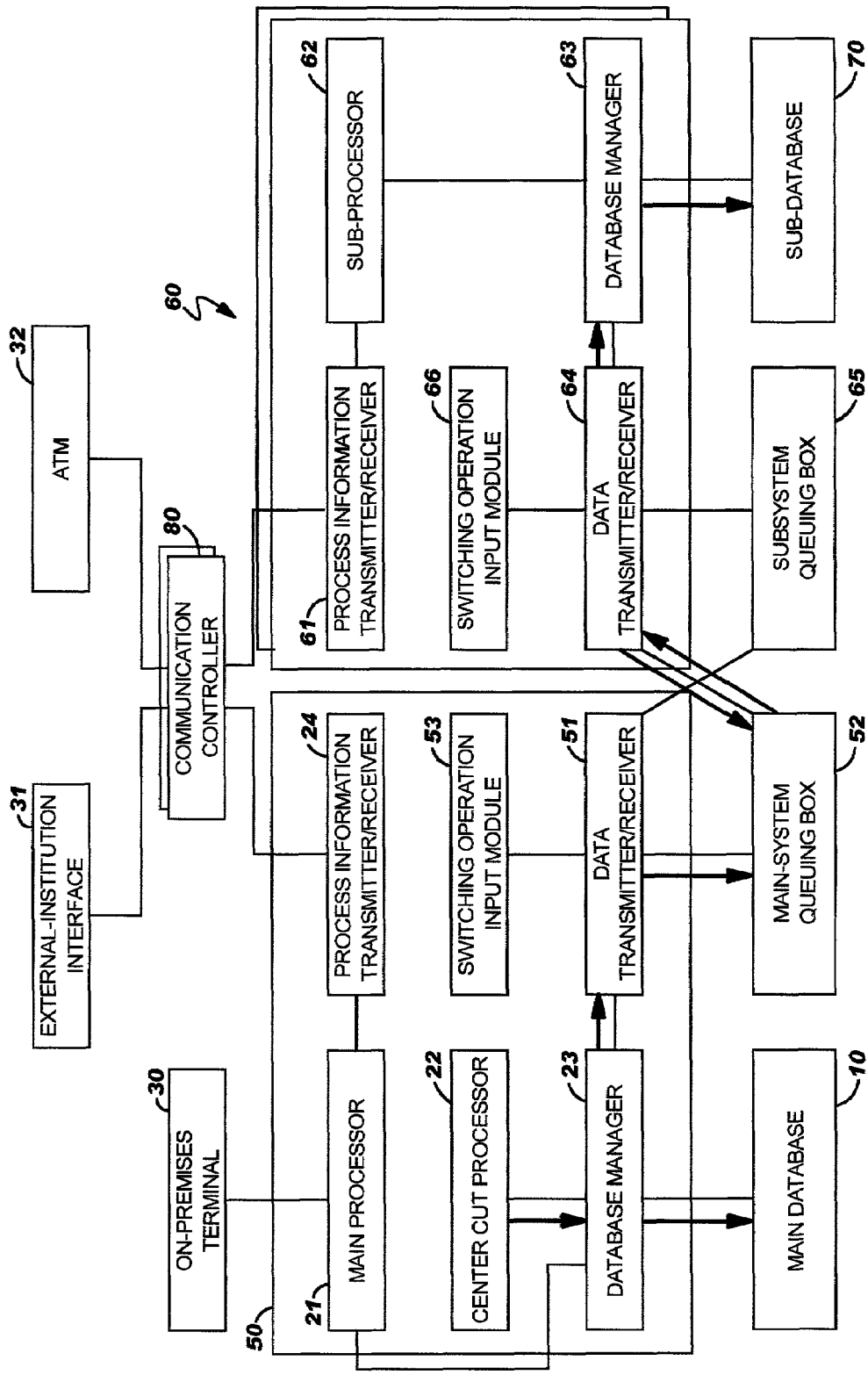
FIG. 4 shows a flow of a process performed using a center cut processor in daytime mode.

FIG. 4 shows an operation of the backbone system for performing a process in response to a request from the center cut processor 22 in daytime mode. The center cut processor 22 handles transactions, such as automatic transfer for public utilities and payment for credit card companies, that are performed on designated dates for a contractor, indicated in advance by a customer of the financial institution.

When the center cut processor 22 performs, for example, a transfer on a designated date, it performs the transaction according to pre-registered account identification information and transaction information, such as the amount of transfer, obtained from the a contractor. That is, it pays a charge or cost from a customer account to the contractor, and transfers account information such as the account balance changed as a result of the transaction to the database manager 23. The database manager 23 receives the changed information such as the account balance, stores it in the main database 10, and transfers transfer data such as account balance information generated by extracting only the information that is required by the subsystem 60 in nighttime mode to the data transmitter/receiver 51. The data transmitter/receiver 51 receives the information and places it in the main-system queuing box 52.

In the subsystem 60, the data transmitter/receiver 64 retrieves the transfer data from the main-system queuing box 52 and provides it to the database manager 63. The database manager 63 stores the transfer data in the sub-database 70.

Figure 5:
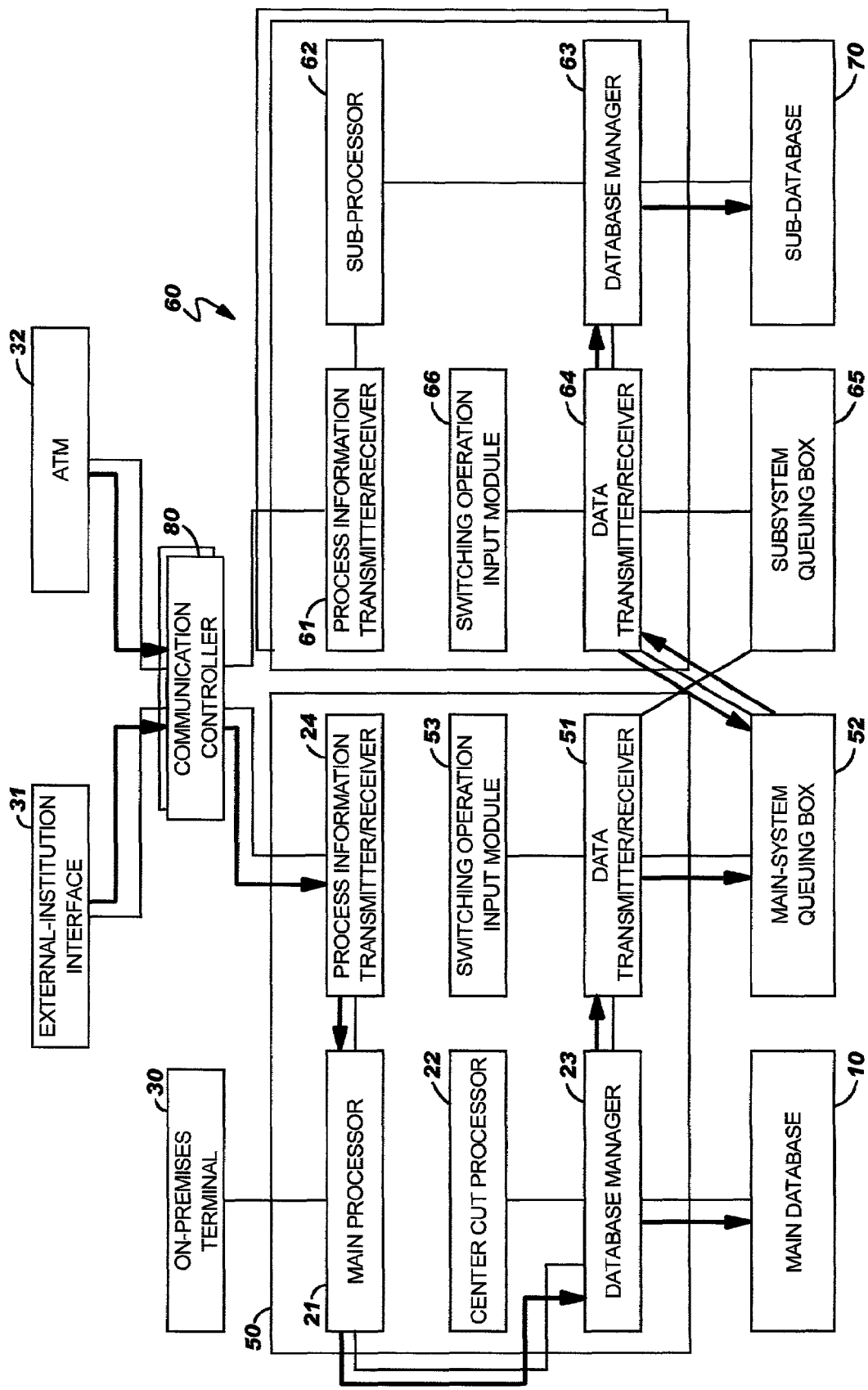
FIG. 5 shows a flow of a process performed in response to a process request provided from a source such as an ATM in daytime mode.

FIG. 5 shows an operation of the backbone system for performing a process in response to a request from an external-institution interface 31 or an ATM 32 in a daytime mode. When a transaction operation such as deposit/withdrawal is performed by a customer on an ATM of another institution tied to the financial institution through the external-institution interface 31, or on the ATM 32, transaction request information according to the transaction operation is transmitted to the process information transmitter/receiver 24 in the main system 50 through the communication controller 80. The process information transmitter/receiver 24 transfers the transmitted transaction request information to the main processor 21. Then, as described with respect to FIG. 3, the main processor 21 performs the requested transaction and transfers account information such as the account balance changed as a result of the transaction to the database manager 23. The database manger 23 receives the changed account information, stores it in the main database 10, and transfers transfer data generated by extracting only the information required by the subsystem 60 in nighttime mode to the data transmitter/receiver 51. The data transmitter/receiver 51 receives the transfer data and places it in the main-system queuing box 52.

In the subsystem 60, the data transmitter/receiver 64 retrieves the transfer data from the main-system queuing box 52 and provides it to the database manager 63. The database manager 63 stores the transfer data in the sub-database 70.

Figure 6:
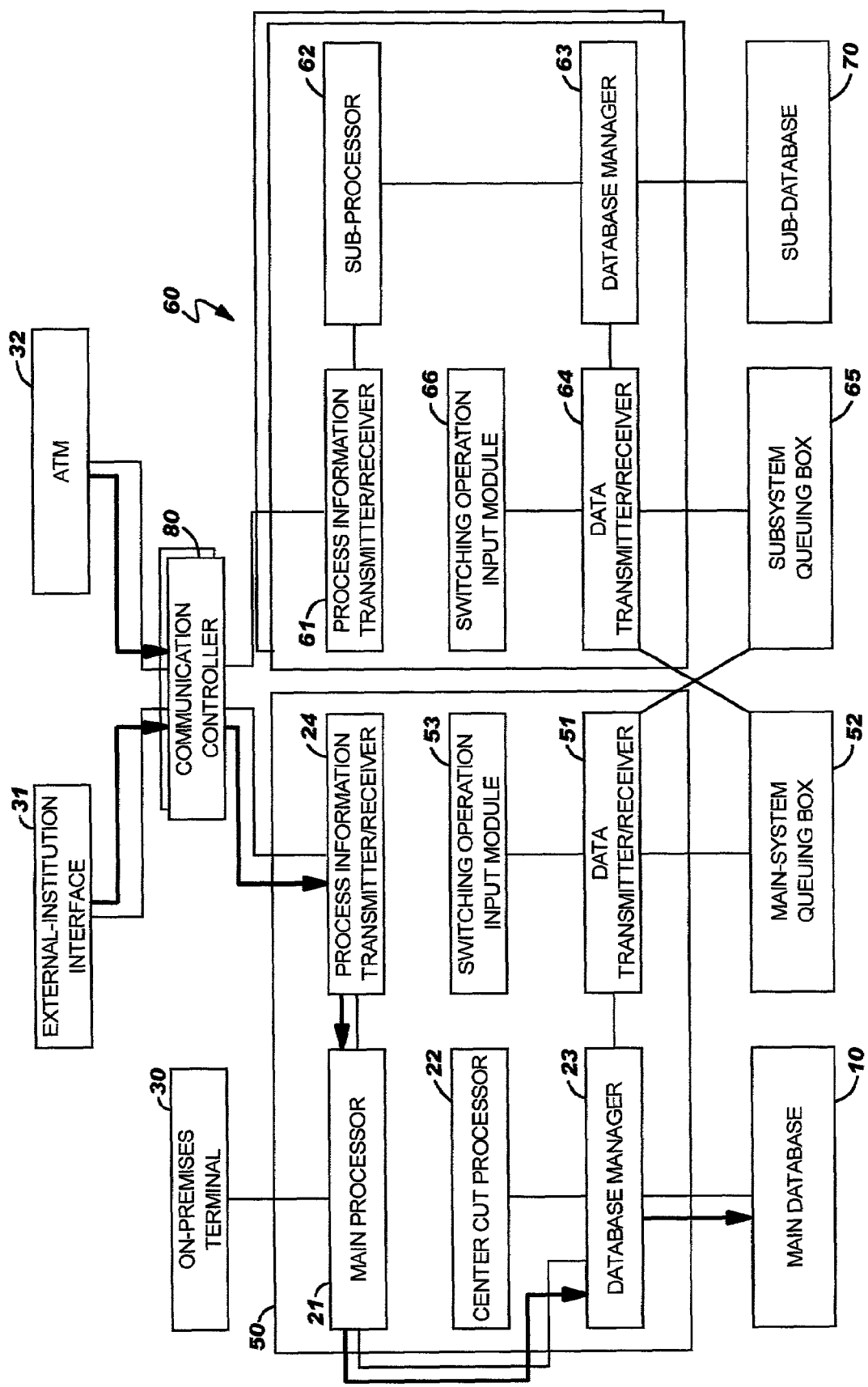
FIG. 6 shows a flow of a process performed in response to a request provided from a source such as the ATM in daytime mode that is not performed in nighttime mode.

FIG. 6 shows an operation of the backbone system in daytime mode for performing a process that is not performed in nighttime mode, in response to a request from the external-institution interface 31 or the ATM 32.

When a customer performs a transaction operation related to his/her time deposit on an ATM of another institution tied to the financial institution through the external-institution interface 31, or on the ATM 32, transaction request information is transmitted to the main processor 21 through the communication controller 80 and the process information transmitter/receiver 24. The main processor 21 performs the requested transaction and transfers account information such as the account balance changed as a result of the transaction to the database manager 23. The database manager 23 receives it, determines that the transaction requested by the customer relates to a time deposit and is not handled in nighttime mode (see FIG. 2), and, unlike the case described with respect to FIG. 5, stores the changed account information only in the main database 10 without transferring the data to the subsystem 60.

In this way, the transfer data, which is difference data changed as a result of the transaction performed in the main system 50, is transferred from the main system 50 to the subsystem 60, reflected in the sub-database 70, and information required in nighttime mode can be obtained in the subsystem 60.

An operation of the backbone system in nighttime mode will be described below with respect to FIG. 7. When a customer performs a transaction operation such as deposit or withdrawal on another institution's ATM through the external-institution interface 31 or the ATM 32 at the nighttime mode, the communication controller 80 transmits a transaction request according to the operation to the transaction request information transmitter/receiver 61 in the subsystem 60.

The transaction request information transmitter/receiver 61 transfers the transmitted transaction request information to the sub-processor 62 and on receiving the request information, the sub-processor 62 performs the requested transaction as the main processor 21 does in daytime mode. The sub-processor 62 references data stored in the sub-database 70 through the database manager 63 based on account identification information and the transaction request information transferred from the external-institution interface 31 or the ATM 32. Data required for the verification and authentication of the customer's account and account information data such as account balances are pre-stored in the sub-database 70 based on the account identification information. The data is updated according to transfer data transferred from the main system 50 in daytime mode. The sub-processor 62 references the data in the sub-database 70, verifies and authenticates the account based on the account identification information, then executes the requested transaction based on the transaction information.

Then the sub-processor 62 passes account information changed as a result of the executed transaction as well as a transaction log (transaction data) of the execution of the transaction, that is, data such as the received transaction request information (transaction request items), the results (such as the account balance after the transaction) of the transaction executed based on the transaction request information, and the amount added or withdrawn, to the database manager 63 as difference information.

The database manager 63 stores the account information and transaction log in the sub-database 70 and transfers the transaction log to the data transmitter/receiver 64. The data transmitter/receiver 64 places the transaction log in the subsystem queuing box 65.

In this way, during nighttime mode, processes are performed by the subsystem 60, data updated by the processes is stored in the sub-database 70, and the transaction log is stored in the subsystem queuing box 65 as updated information about all the transactions that were performed during the nighttime mode.

Figure 8:
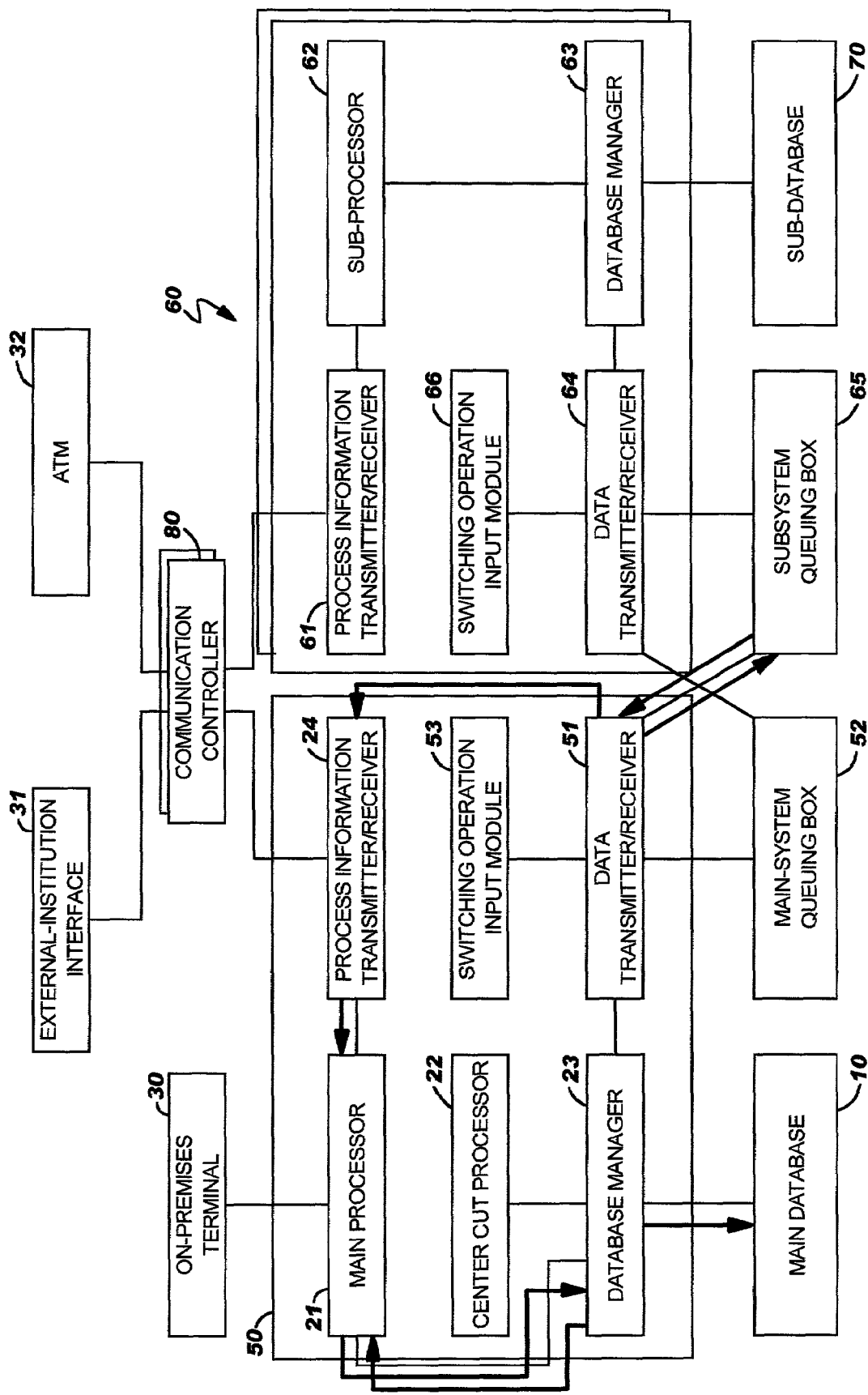
FIG. 8 shows a flow of switching from nighttime mode to daytime mode.

Before shifting to daytime mode, data is transferred from the sub-database 70 to the main database 10 in the backbone system. FIG. 8 shows an operation of the backbone system during the shift. As shown in FIG. 8, when data is transferred from the sub-database 70 to the main database 10, the data transmitter/receiver 51 in the main system 50 retrieves transaction log data which was stored in the subsystem queuing box 65 during nighttime mode. The retrieved transaction log is provided to the main processor 21 through the process information transmitter/receiver 24 as transaction request information.

The main processor 21 re-performs transactions performed during the nighttime mode, based on the provided transaction log. That is, it re-performs the transactions based on the transaction request information included in the transaction log and checks the results of the re-performance against the results of the transactions performed in nighttime mode to verify the transactions. It then stores account information, such as account balances, that became different from account information at the end of the daytime mode in the previous day as a result of the re-performance in the main database 10 through the database manager 23. Thus, the main database 10 will contain only the data processed by the main system 50.

Switching from nighttime mode to daytime mode, or from daytime mode to nighttime mode will be described below.

Figure 9:
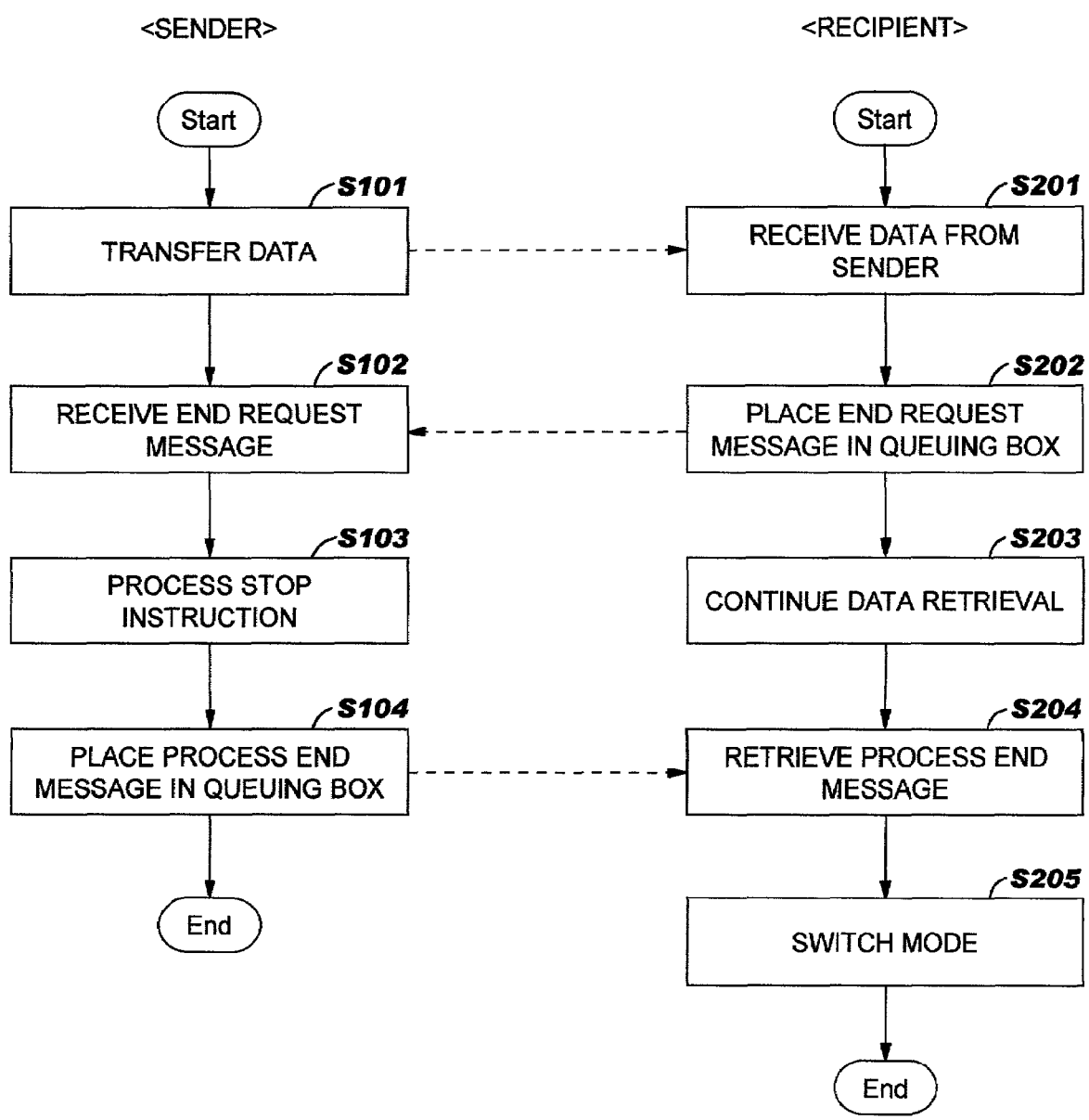
FIG. 9 shows a detailed flow of mode switching from nighttime mode to daytime mode.
Figure 10:
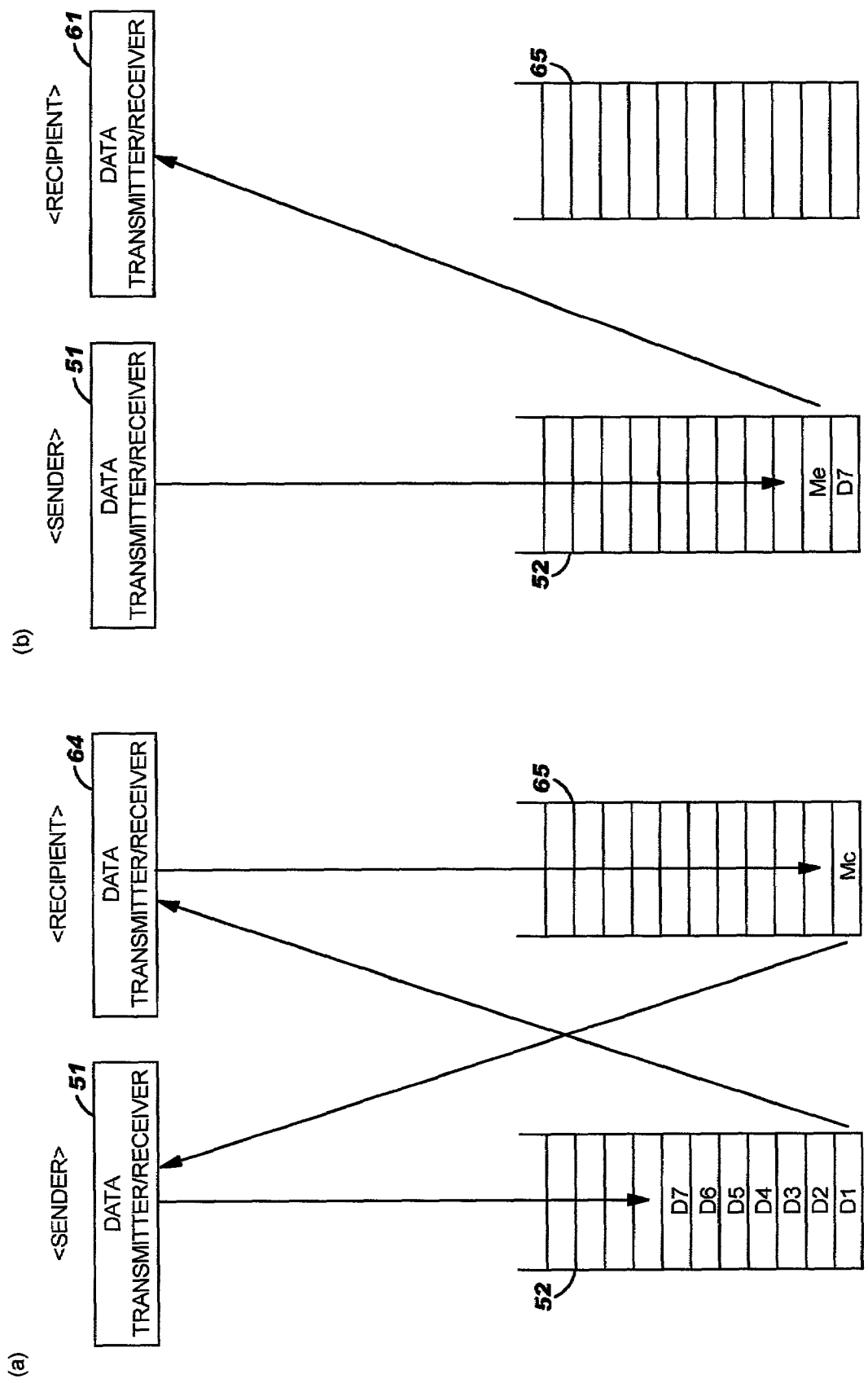
FIG. 10 is a diagram of message communication during mode switching.

FIG. 9 shows a process flow in the main system 50 and subsystem 60 during mode switching. FIG. 10 shows data communication in an asynchronous data network during the mode switching. Switching from daytime mode to nighttime mode will be described herein. The main system 50 is the sender and the subsystem 60 is the recipient of the data.

As shown in FIG. 9, the data transmitter/receiver 51 in the main system 50 transfers asynchronously transfer data consisting of information such as account information that was changed as a result of transactions performed in the main system 50 during daytime mode to the sub-database 70 by asynchronous processing through the main-system queuing box 52 until the end of daytime mode (step S101).

On the other hand, the data transmitter/receiver 64 in the subsystem 60 sequentially retrieves (reads) the transfer data from the main-system queuing box 52 (step S201), thus receiving the transfer data in an asynchronous manner.

It is assumed that transfer data D1 through D7 shown in FIG. 10a are contained in the main-system queuing box 52 at the end time of the daytime mode during which the asynchronous data transfer is being performed as described above. When the end time of daytime mode is reached, a mode switching operation is performed in the switching operation input module 66 in the subsystem 60. Then an end request message Mc output from the switching operation input module 66 automatically or through a manual operation by a user is placed in the subsystem queuing box 65 by the data transmitter/receiver 64 (step S202).

Then the data transmitter/receiver 51, which retrieves data from the subsystem queuing box 65 with predetermined timing, retrieves the end request message Mc from the subsystem queuing box 65. Thus, the end request message Mc provided from the subsystem 60 is received by the main system 50 (step S102). In the main system 50, an instruction for stopping transaction processing in the main system 50 is issued to the main processor 21 and center cut processor 22 (step S103). When the main processor 21 and center cut processor 22, which receive the instruction, stop processing in daytime mode, a process end message Me is placed in the main-system queuing box 52 through the data transmitter/receiver 51 in the main system 50 (step S104).

In the subsystem 60 on the other hand, the data transmitter/receiver 64 continues reading data from the main-system queuing box 52 (step S203) after the end request message Mc is output at step S202. Data is sequentially retrieved from the main-system queuing box 52 until the process end message Me placed in step S104 is retrieved (step S204).

Figure 7:
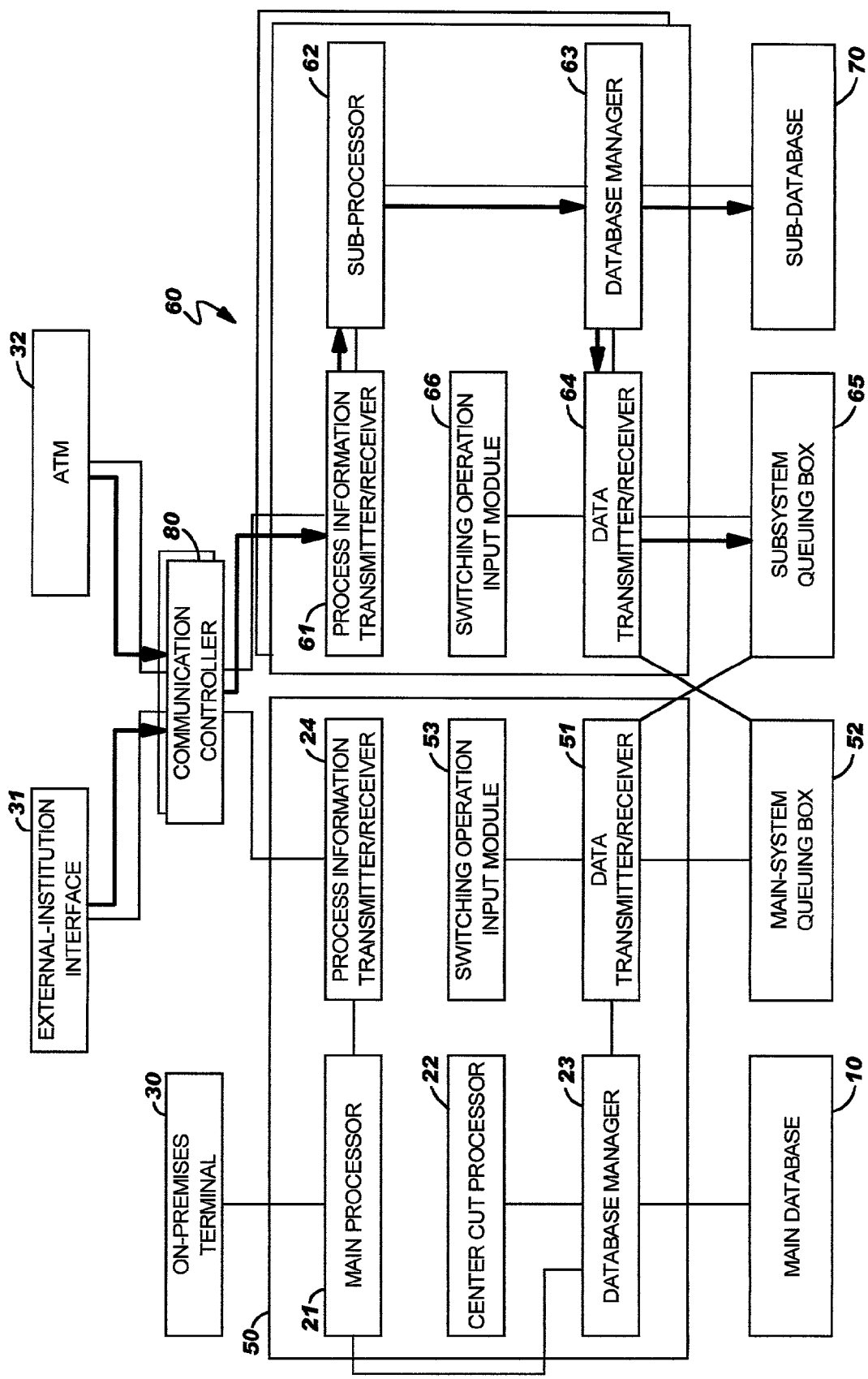
FIG. 7 shows a flow of a process performed in nighttime mode.

When the process end message Me is retrieved, the subsystem 60 switches from daytime mode to nighttime mode (step s205) and accepts a transaction from the external-institution interface 31 or ATM 32 as shown in FIG. 7. This completes the switching from daytime mode to nighttime mode.

With the above-described mode switching, the communication controller 80 shifts the transfer destination of transaction requests from the external-institution interface 31 and the ATM 32 from the main system 50 to the subsystem 60.

While switching from daytime mode to nighttime mode has been described, switching from nighttime mode to daytime mode also can be accomplished by transferring data from the subsystem 60 to the main system 50 as shown in FIG. 8 and then performing a similar process in which the sender and the recipient are replaced with each other.

The maintenance of the main system 50 and the main database 10 can be performed during nighttime mode without hindrance while transactions are performed by using the subsystem 60 and the sub-database 70 in nighttime mode.

Figure 11:
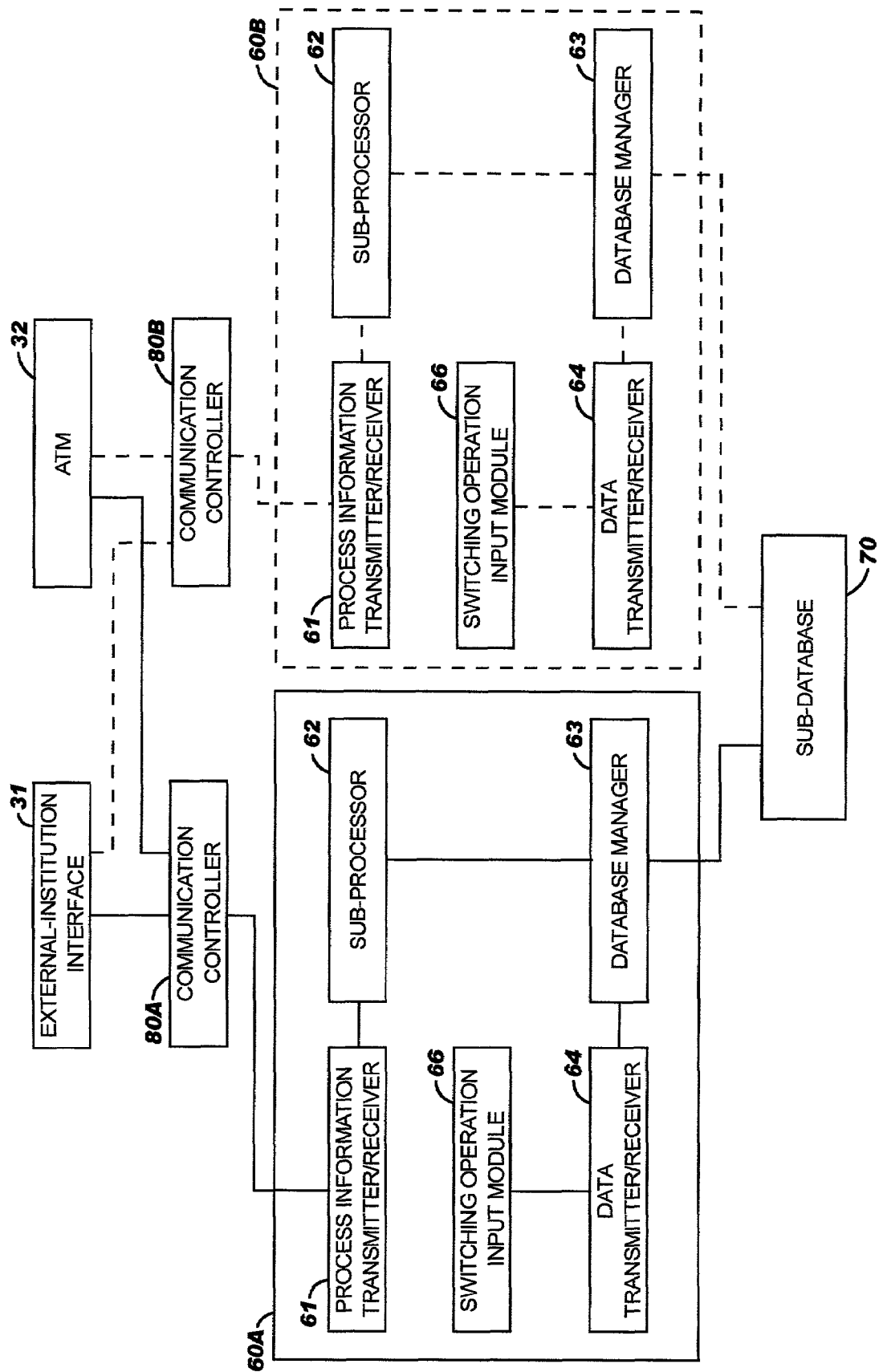
FIG. 11 shows a configuration of duplicated subsystems.

The subsystem 60 not only transfers data to the sub-database 70 in nighttime mode but also in daytime mode, therefore a part of it operates also in daytime mode. The communication controller 80 continuously operates during daytime mode and nighttime mode. However, because the subsystem 60 and communication controller 80 may be duplicated in a configuration like mirroring or clustering as mentioned earlier, as shown in FIG. 11, one subsystem 60A and communication controller 80A can be used in normal operation and the other subsystem 60B and communication controller 80B can be used during maintenance so that a mechanism for stable continuous operation can be provided.

In addition, to perform maintenance of the sub-database 70, the data transmitter/receiver 64 of the subsystem 60 can stop the reading of data from the main-system queuing box 52 before the maintenance. After the completion of the maintenance, the data transmitter/receiver 64 can restart the reading of data from the main-system queuing box 52 to store the data on transactions performed in the main system 50 in the sub-database 70 during maintenance without causing any hindrance.

In the above-described configuration, the main system 50 and the main database 10 operate in daytime mode and the subsystem 60 and the sub-database 70 operate in nighttime mode to perform processes involved in transactions. Thus, 24-hour operation services can be provided to customers.

Moreover, because the main system 50 and main database 10 pair and the subsystem 60 and sub-database 70 pair operate alternately, and data is transferred between them in an asynchronous manner, their maintenance can be performed without hindrance. When the financial institution requires data maintained at month-end, it can readily retrieve the data from the main database 10 during nighttime mode in which the main system 50 and main database 10 is inactive.

Furthermore, the subsystem 60, which is responsible for processing in nighttime mode, transfers a transaction log kept in nighttime mode to the main system 50 and the main processor 21 in the main system 50 re-performs processes performed during the nighttime mode based on that transaction log in returning to the daytime mode and stores data resulting from the re-performance in the main database 10. That is, the main system 50 in the backbone system acts as a primary system and data processed in the main system 50 is stored in the main database 10, and subsystem 60 and the sub-database 70 merely perform processes in nighttime mode as substitutes for the main system 50 and main database 10. Therefore it is not required that the entire system be duplicated, and the above-mentioned backbone system is realized at low cast.

Figure 12:
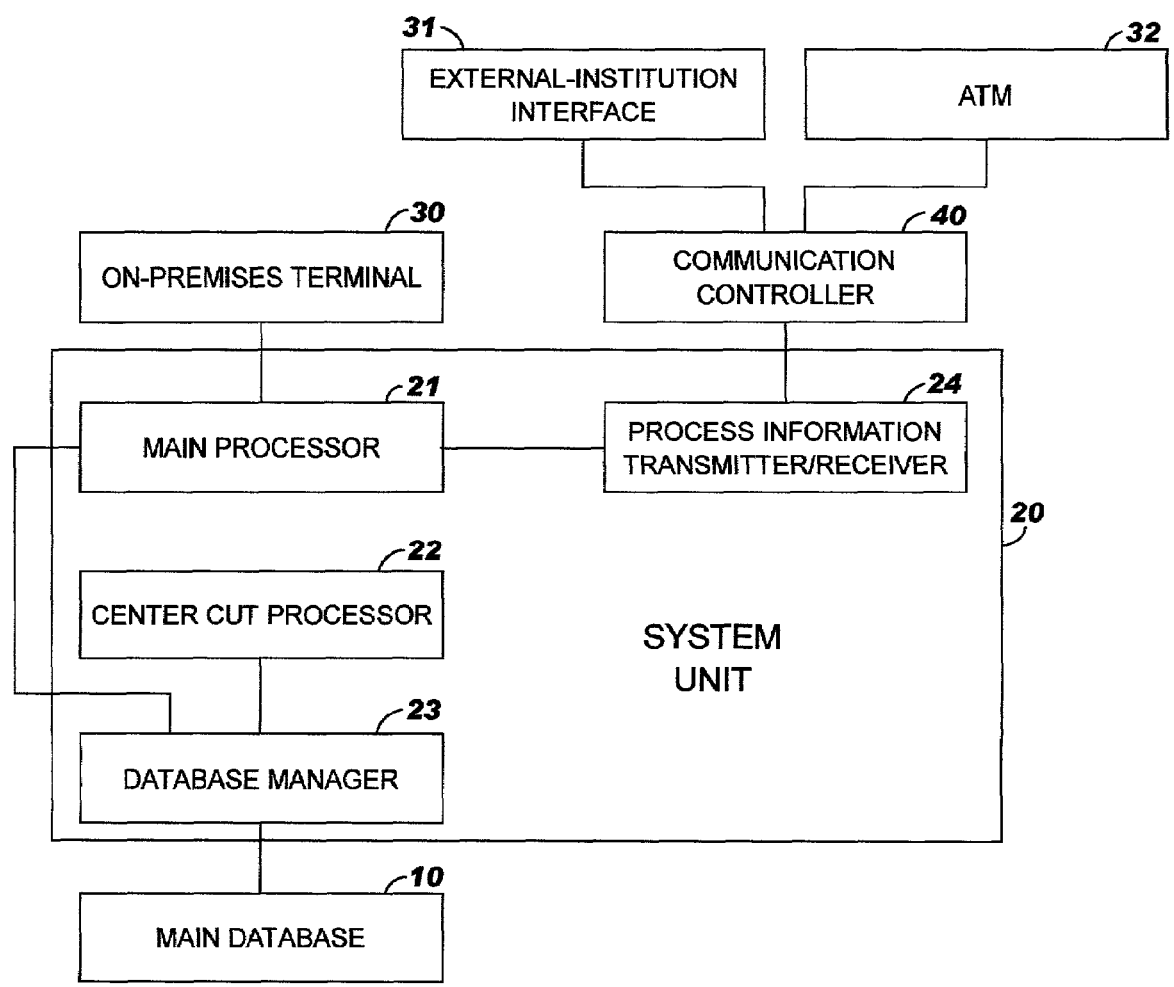
FIG. 12 shows a basic configuration of a prior-art backbone system.

In addition, the backbone system as described above can use an existing accounting system as the main system 50. That is, the above-described backbone system can be constructed by making minor modifications such as adding the data transmitter/receiver 51, main-system queuing box 52, subsystem 60, sub-system queuing box 65, sub-database 70, communication controller 80, and other components to the existing accounting system configured as shown in FIG. 12. Such a configuration using an existing accounting system can significantly contribute to the reduction of costs of constructing the backbone system.

If an existing accounting system is used as the main system 50, the following method can be used in migrating from the existing accounting system to the backbone system described above.

The subsystem 60 and the sub-database 70 are constructed while the existing accounting system (main system 50) is used and, after they become ready, some, for example only one, of ATMs 32 are connected to the subsystem 60 and the remaining ATMs 32 are connected to the main system 50 by the communication controller 80. Then the operation of the constructed subsystem 60 and sub-database 70 is checked in some of ATMs 32 to see if they work successfully. When it is determined that they work well, the other ATMs 32 can be connected to the subsystem 60 stepwise.

This method can prevent the entire system from shutting down and the migration can be made smoothly compared with replacing the entire backbone system.

While data is transferred from the main system 50 to the sub-database over an asynchronous data network in daytime mode in the embodiment described above, the data may be held in the main-system queuing box 52 in daytime mode as well as nighttime mode and, when shifting to nighttime mode, the data may be retrieved from the main-system queuing box 52 by the data transmitter/receiver 64 in the subsystem 60 and stored in the sub-database 70. This allows the maintenance of the subsystem 60 to be performed anytime during daytime mode. In addition, this arrangement can eliminate the need for duplicating the subsystem 60.

While the main system 50 re-performs processes based on data retrieved from the subsystem queuing box 65 when switching from nighttime mode to daytime mode, the data retrieved from the subsystem queuing box 65 may be directly reflected in the main database 10 without re-performing the processes. This arrangement, however, requires that all the account information (such as account balances) that is changed as a result of transactions be stored in the subsystem queuing box 65 during nighttime mode, like the main system 50 in daytime mode and therefore the subsystem queuing box 65 should have a capacity large enough for storing that information. In contrast, the above-described embodiment storing only transaction log in the subsystem queuing box 65 requires a smaller capacity of the subsystem queuing box 65, thus contributing to the reduction of costs for the system.

While the terms "daytime mode" and "nighttime mode" have been used in the description of the embodiment, nighttime mode of course includes all time periods (for example holidays) other than a predetermined period during daytime mode, that is, on business days (business days of a financial institution). The daytime mode period and nighttime mode period may be set by individual financial institutions as appropriate. In addition, it is not necessarily required that a system operate on a 24-hour basis. The same advantage as that of the above-described embodiment can be obtained by any system operating by switching between two modes such as the daytime mode and nighttime mode as described above.

While the embodiment has been described with respect to the backbone system of a financial institution by way of example, a similar configuration can be applied to any other data processing system and other systems that perform a predetermined process and store data resulting from the process in storage such as a database.

Other modification can be made to the configurations described above with respect to the embodiment without departing from the spirit of the present invention. For example, some components may be omitted from or other components can be added to the above described configuration.

DESCRIPTION OF SYMBOLS

10 . . . Backbone database (database, first data storage, first database)
21 . . . Main processor 23 . . . Database manager
31 . . . External-institution interface
32 . . . ATM (terminal)
50 . . . Main system (alternative data processing system, first data processor)
51, 64 . . . Data transmitter/receiver
52 . . . Main-system queuing box
53, 66 . . . Switching operation input module (mode switching controller)
60 . . . Subsystem (data processing system, second data processor, system, financial transaction apparatus)
62 . . . Sub-processor (process executer, transaction executer)
63 . . . Database manager
65 . . . Subsystem queuing box (change information storage, transaction data storage, difference information storage)
70 . . . Sub-database (data storage, second data storage, second database)
80 . . . Communication controller (distribution controller, process request acceptance module, selective transfer module, switching controller)

I claim:

1. A data processing system for performing data processing in response to a process request input from an external source, comprising:
a main database for receiving and storing data, said data comprising at least part of sub-database data stored in a sub-database of another data processing system, from said another data processing system;
a main processor for performing a process based on said process request and said data stored in said main database;
a data transceiver for transferring from said data processing system to said another data processing system, in an asynchronous manner, change information in said data stored in said main database resulting from the process performed by said main processor, wherein said data transceiver outputs said change information to said another data processing system in response to a data request provided from said another data processing system; and
a communication controller for assigning the process request input from the external source to either said data processing system or said another data processing system based on predetermined time of day criteria.

2. The data processing system according to claim 1, further comprising a queueing box for temporarily storing said change information and, when the distribution destination of said process request is switched by said communication controller from said data processing system to said another data processing system, transferring said change information from said queueing box to said another data processing system.

3. A data processing system, comprising:
communication controller for accepting a process request from an external source, the external source being external to the data processing system;
a first processor for processing data in response to the process request accepted in said communication controller;
a second processor provided separately from said first processor for processing data in response to said process request accepted in said communication controller, said communication controller selecting one of said first and second processors as a transfer destination and transferring said process request to said selected transfer destination;
a data transceiver for transferring data in an asynchronous manner between said first and second processors;
wherein said data transceiver temporarily scores, in a first queueing box, data processed in said first processor and, when requested from said second processor, provides the processed data to said second processor, and also temporarily stores, in a second queueing box, data processed by said second processor and, when requested from said first processor, provides said processed data to said first processor, and wherein said communication controller switches the transfer destination of said process request from said first processor to said second processor or from said second processor to said first processor according to a time at which said communication controller accents the process request.

4. The data processing system according to claim 3 further comprising a main database for storing data and a sub-database for storing part of the data stored in said main database,
wherein said first processor references the data stored in said main database to perform a process based on the referenced data and said process request, and stores the processed data in said main database; and
said second processor references the data stored in said sub-database to perform a process based on the referenced data and said process request, and stores the processed data in said sub-database, and wherein said first processor transfers data that meets predetermined criteria out of said data processed by said first processor to said second processor through said data transceiver and said second processor stores said data transferred from said first processor in said sub-database, the predetermined criteria specifying types of transactions capable of being performed by the second processor.

5. The data processing system according to claim 4,
wherein said data transceiver transfers from said second processor to said first processor at least part of the data stored by the process performed by said second processor in said sub-database when said communication controller switches the transfer destination of said process request from said second processor to said first processor, and wherein said first processor performs a second process based on the data transferred from said second processor to said first processor to form processed data, and stores the processed data in said main database.

6. A system including a data processing system connected to an existing financial transaction system having a main database, comprising:
a sub-database for receiving and storing part of account information stored in said main database from said financial transaction system;
a processor for referencing said account information stored in said sub-database in response to a transaction request provided from a terminal operated by a customer to perform a transaction according to said transaction request;
a data transceiver for transferring account information changed as a result of the transaction to said financial transaction system in an asynchronous manner; and
a communication controller for switching a connection destination of the terminal between said financial transaction system and said data processing system, wherein said data transceiver stores, in a queuing box, transaction data concerning the transaction performed by said processor, said transaction data including at least said transaction request, and said transceiver transfers said transaction data from the queuing box to said financial transaction system when said communication controller switches said connection destination of said terminal from said data processing system to said financial transaction system and said financial system re-performs the transaction for said transaction request to verify the transaction and stores account information changed as a result of the re-performed transaction in said main database.

7. The data processing system according to claim 6, wherein said processor and said data transceiver are duplicated.

8. An accounting system for a financial institution, comprising:
   a communication controller for controlling, dam communication from a terminal on which a customer performs a transaction operation m said accounting system;
   a first database for storing account information about an account of the customer;
   a first processor for referencing said account information stored in said first database in response to a transaction request provided from said terminal through said communication controller to perform a transaction, and storing account information changed as a result of said transaction in said first database;
   a second database for storing part of said account information stored in said first database based upon a list of account services that are provided;
   a second processor for referencing said account information stored in said second database in response to a transaction request provided from said terminal through said communication controller to perform a transaction, and storing the account information changed as a result of said transaction in said second database;
   a data transceiver for performing a data transfer between said first database and said second database in an asynchronous manner; and
   a switching operation input module for switching between a first mode in which said first data processor and said first database are operated and a second mode in which said second processor and said second database are operated, wherein said switching operation input module switches between said first mode and said second mode according to predetermined time periods;
   wherein said first processor extracts information used in said second mode from said account information changed as a result of said transaction and transfers said extracted information to said second processor as determined by the list of account services, wherein the list of account services specifies types of transactions that are performed by both the first mode and the second mode; and said second processor stores said extracted information in said second database.

9. The accounting system according to claim 8,
   wherein said second processor sends at least an account number of said customer and a transaction request item in said transaction request to said first processor as a transaction log when switching is performed from said second mode to said first mode; and
   said first processor re-performs the transaction for said transaction request based on said transaction log and stores the account information changed as a result of the re-performed transaction in said first database.

10. The accounting system according to claim 8,
    wherein only part of a transaction menu that can be performed by said first processor in said first mode is performed by said second processor in said second mode.

11. A data processing system connect to an existing financial transaction system having a main database, comprising:
    a sub-database for receiving and storing part of account information stored in said main database from said financial transaction system as determined by a list of account services and a predetermined time of day criteria;
    a processor for referencing said account information stored in said sub-database based on a transaction request provided from a terminal operated by a customer to perform a transaction in response to said transaction request; and
    an information storage for storing information changed in the account information stored in said sub-database as a result of the transaction, wherein the list of account services s specifies types of transactions that are performed by the processor;
    wherein said information storage outputs said information to said financial transaction system in response to a request provided from said financial transaction system and said financial system re-performs the transaction for said transaction request to verify the transaction and stores account information changed as a result of the re-performed transaction in said main database.

12. A method of operating a data processing system, comprising a first processing system having a first database, and a second data processing system having a second database, said method comprising the steps of:
    processing by said first processing system a first process request from an external source and storing data resulting from the processing by said first processing system in said first database;
    transferring and storing at least part of the data resulting from the processing by said first processing system into said second database through a first data transceiver asynchronously as determined by a list of account services, wherein the list of account services specifies types of transactions that are performed by both the first processing system and the second processing system, with the second processing system operable for performing a subset, but not all, of the types of transaction that are performed by the first processing system;
    switching connection of the external source from said first processing system to said second processing system based on predetermined time of day criteria; and
    processing by said second processing system a second process request from the external source and storing data resulting from the processing by said second processing system in said second database.

13. The method according to claim 12, further comprising the steps of:
    providing the data resulting from the processing by said second processing system to a second data transceiver;
    transferring and storing the data resulting from the processing by said second processing system into said first database through the second data transceiver asynchronously; and
    switching connection of the external source from said second processing system to said first processing system, wherein said first processing system re-performs the processing performed in response to the process request received from the external source in said second processing system and stores data resulting from the re-performed processing by said first processing system in said first database, where the data resulting from the re-performed processing by said first processing system is stored in said first database by said first processing system.

14. The method according to claim 12, wherein said step of switching connection of the external source is performed by message communication through the first data transceiver.

* * * * *